US006252913B1

United States Patent
Kientz

(12) United States Patent
(10) Patent No.: US 6,252,913 B1
(45) Date of Patent: Jun. 26, 2001

(54) METHOD OF TRANSMITTING A FREQUENCY-MODULATED ASYNCHRONOUS NRZ SIGNAL

(75) Inventor: Alfred Kientz, Le Plessis Grohan (FR)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 08/969,511

(22) Filed: Nov. 13, 1997

(30) Foreign Application Priority Data

Nov. 19, 1996 (FR) .................................................. 96 14091

(51) Int. Cl.[7] ............................. H04L 25/49; H03D 3/24
(52) U.S. Cl. ............................... 375/292; 375/376
(58) Field of Search .............................. 331/1 A, 17, 18, 331/25; 375/354, 371, 373, 376

(56) References Cited

U.S. PATENT DOCUMENTS 5,200,930 * 4/1993 Rouquette .............................. 367/76

OTHER PUBLICATIONS

"Techniques de l'Ingenieurs, Electronique", Chapter E7100, p. 4.

* cited by examiner

*Primary Examiner*—William Luther
(74) *Attorney, Agent, or Firm*—Daniel J. Piotrowski

(57) ABSTRACT

A sometimes positive and sometimes negative frequency deviation is associated to a given logic value. The deviation is positive during a certain period of time and then negative, the respective periods being determined so that the cumulated sums of the positive and negative deviation periods are practically equal. A device comprises to this effect an analyzer element for analyzing the asynchronous NRZ signal, having an analog integrator (1, 2) for measuring time, which actuates a switch (3) for selecting a control voltage (MOD) from three voltages. This analyzer element comprises a D-flipflop (2) to whose clock input (CP) is fed the asynchronous NRZ signal, with a resistance-capacitance feedback (4, 1) between its output Q and its input D, and with means (3) for connecting the output $\bar{Q}$ of the flipflop (2) to its input D when the NRZ signal has a given logic level.

9 Claims, 2 Drawing Sheets

METHOD OF TRANSMITTING A FREQUENCY-MODULATED ASYNCHRONOUS NRZ SIGNAL

BACKGROUND OF THE INVENTION

1. Field of the invention

The present invention relates to a method of transmitting a frequency-modulated asynchronous NRZ signal, associating a transmitting frequency called center frequency to a given logic value and a frequency deviation which is sometimes positive and sometimes negative relative to the center frequency to the reverse logic value.

The invention further relates to a transmitter device for transmitting frequency-modulated asynchronous NRZ data and a receiver device for such data.

"Asynchronous" is understood to mean the fact that the signal may change from one logic state to another at any moment, irrespective of any clock.

2. Description of Related Art

There is a difficulty with a DC component, when one wishes to transmit a frequency-modulated asynchronous NRZ signal, due to the fact that the signal comprises an unequal number of bits in either one of the logic states. Let us suppose, for example, that a high-frequency oscillator is used, directly modulated by a two-level signal for which the frequency is more often deviated than centered: under the influence of its feedback loop, the oscillator drifts so that the deviated frequency approaches the nominal frequency. A partial solution is provided by a signal which is sometimes positive and sometimes negative for a given logic value. Such a signal is known to the expert: for example, the publication "Techniques de l'ingénieurs, Electronique" chapter E7100, page 4, shows a signal called bipolar signal whose "one" bits are alternately positive and negative. The problem is, however, not completely solved by utilizing such a signal, because an unbalance may continue to exist and, furthermore, with an asynchronous signal, the absence of a clock linked with the signal does not permit of counting its bits for generating alternately positive and negative bits. This problem could be solved, for example, by working at a low frequency with an oscillator without feedback, then transposing the produced frequency to higher values which would necessitate a relatively complex device.

SUMMARY OF THE INVENTION

It is an object of the invention to solve this problem in a simple manner.

For this purpose, the deviation has a positive value during a first period of time and then a negative value during a second period of time, these periods of time being determined in analog manner, so that the cumulated sum of the first periods and the cumulated sum of the second periods are practically equal in the course of time.

The invention is thus based on the idea of "fairly" distributing the positive and negative modulations based on time measurements.

Preferably, a period in which the frequency is the center frequency is always situated between a period having a positive frequency deviation and a period having a negative frequency deviation.

In this manner, the risk of bringing about an artefact is avoided: without this arrangement, as the signal mandatorily passes through the center frequency during a sign change of the frequency deviation, at the receiving end this could for a brief moment lead to the creation of an "error" bit corresponding to this center frequency.

Advantageously, the frequency modulation being provided by an oscillator having a phase-locked loop, the time constant of this loop is higher than said periods of time.

Thus, the phase locking of the oscillator does not run the risk of excessively impeding the frequency deviation.

A transmitter device according to the invention, comprising a frequency control voltage generator which produces three control voltage values called low, median, high voltage, associating the median voltage to a given logic value, and sometimes the high voltage and sometimes the low voltage to the reverse logic value, further comprises means for producing the high voltage during a first period of time and the low voltage during a second period of time, so that the cumulated sum of the first periods and the cumulated sum of the second periods are practically equal in the course of time.

For this purpose, the device comprises an analyzer element for analyzing the incoming asynchronous NRZ signal, which analyzer comprises an analog integrator for measuring time and actuates a switch for the selection of one of the three control voltage values.

In an advantageous embodiment, the analyzer element comprises a D-flipflop to whose clock input is fed the asynchronous NRZ signal, a resistance-capacitance feedback network between the output Q and the input D of the flipflop, and means for connecting its output $\overline{Q}$ to its input D only when the NRZ signal has a given logic value.

For processing a demodulated signal, a receiver device according to the invention comprises a comparator whose threshold voltage is set so that it is activated by a negative signal, another comparator whose threshold voltage is set so that it is activated by a positive signal, and a logic circuit connected to the outputs of the comparators, whose output, intended to produce the reconstructed NRZ signal, is activated when either comparator is activated.

Advantageously, this device further includes a low-pass filter or analog integrator of the demodulated signal, for producing a voltage called mean voltage which represents the average value of this signal, a shift circuit for producing on its output a shifted voltage relative to this mean voltage, which output is connected to one of the comparators for supplying thereto its threshold voltage, called first threshold voltage.

This makes it possible to compensate the possible DC current drifts of the demodulated signal.

The device further includes a balanced voltage creating circuit for producing on the output a practically balanced voltage of the first threshold voltage relative to the mean voltage, which output is connected to the other comparator for supplying its threshold voltage thereto.

These and other aspects of the invention will be apparent from and elucidated with reference to the embodiments described hereinafter.

DETAILED DESCRIPTION OF THE PREFERRED EMBODIMENTS

Figure 1:
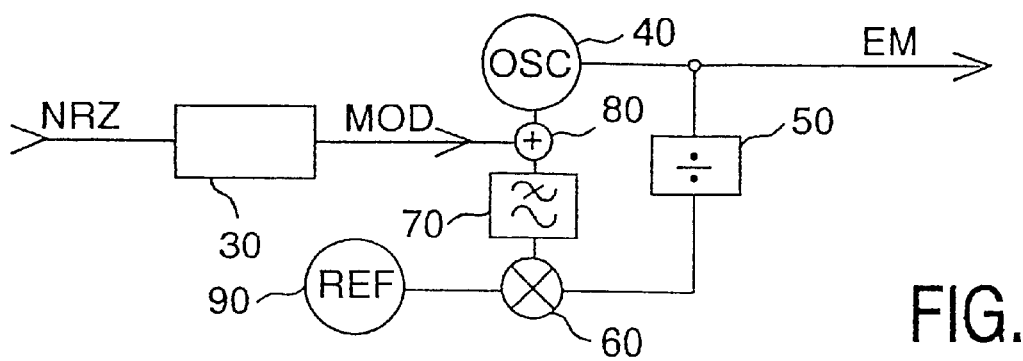
FIG. 1 is a diagram of a transmitter of a digital NRZ signal with a frequency modulator.

In the transmitter of the digital NRZ signal of FIG. 1, a main oscillator 40 produces a frequency-modulated signal EM which forms the output signal of the transmitter.

This signal is led to the input of a frequency divider 50 which supplies a frequency-divided signal to an input of a phase comparator 60 having two inputs. An oscillator referenced 90, for example, a crystal oscillator, applies to the other input of the comparator 60 a reference frequency signal. The error signal of the comparator is led to the main oscillator 40 via a low-pass filter 70 to adjust the frequency of the oscillator. All this forms a phase-locked loop known per se and thus does not need to be described in more detail.

An NRZ signal is conveyed to the input of a frequency control voltage generator 30 which produces on the output a frequency control signal MOD for modulating the oscillator. This signal is added in the element 80 to the error signal coming from the comparator 60, so that the oscillator 40 is frequency modulated.

For example, it is desired that the method of transmitting the asynchronous NRZ signal associates a center or quiescent transmitting frequency to a bit having the logic "one" value, and a frequency deviation which is sometimes positive and sometimes negative to a bit having the logic "zero" value. It is clear that also the reverse could be chosen. The module 30 produces three control voltage values called low, median, high, associating the median value to a "one" bit, and sometimes the high and sometimes the low value to a "zero" bit. The high value is produced for a first period of time and the low value for a second period of time, these periods of time being determined so that the cumulated sum of the first periods and the cumulated sum of the second periods are practically equal in the course of time. The cut-off frequency of the low-pass filter 70 is chosen so that the time constant of the phase-locked loop exceeds these periods of time.

The module 30 comprises an analyzer element for analyzing the asynchronous input NRZ signal, based on an analog integration for measuring the time. This element actuates a switch for selecting one of the three control voltages. Various ways of providing the analyzer element are open to a person of ordinary skill in the art, for example, a time counter may be used, enabled when the NRZ signal is a "zero" signal, and reset to zero for a given counting figure while producing a sign-changing signal at this instant. Among the possible means may be mentioned: a processor programmed for counting clock pulses, or a connected assembly having ports which are open in turns.

Figure 2:
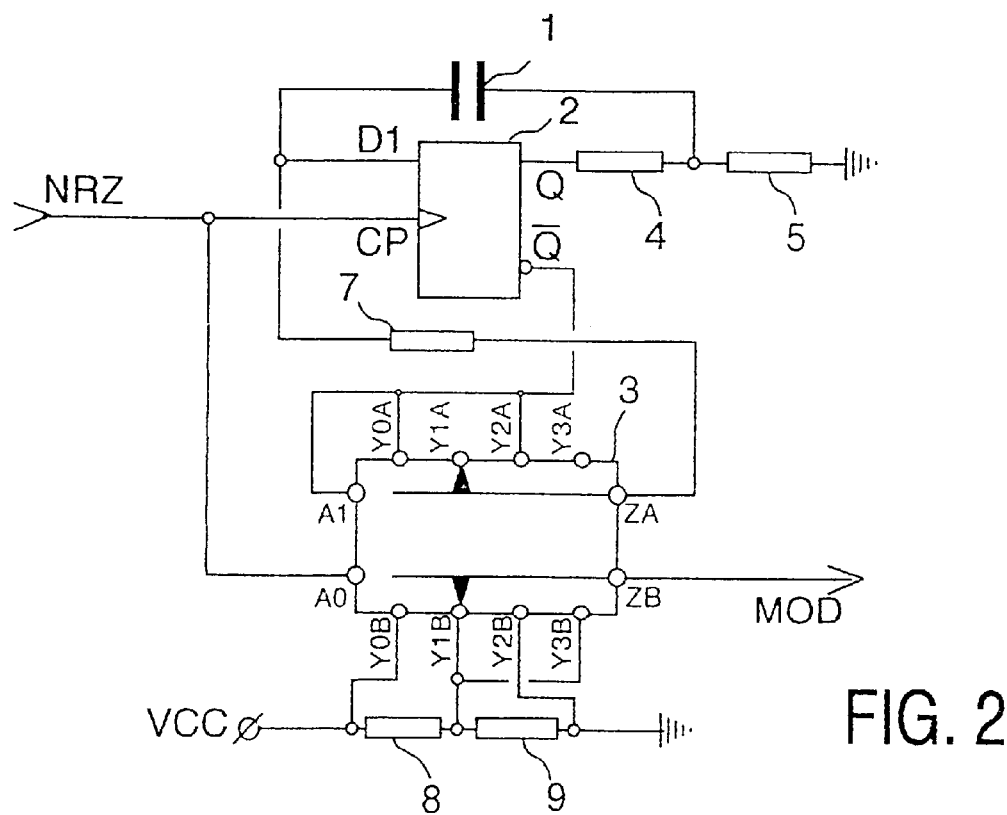
FIG. 2 represents an arrangement which generates a frequency control signal for the modulator of the transmitter of FIG. 1.

None the less, an analog type of embodiment is preferred. In the particular embodiment described here with reference to FIG. 2, the analyzer comprises a D-type flipflop 2. The asynchronous NRZ signal is conveyed to the input called clock input CP of this flipflop, which has a feedback network formed by a resistor 4 and a capacitor 1, combined in series between its output Q and its input D1. A resistor 5 which has a lower value than that of resistor 4 is connected between the node between the resistor 4 the capacitor 1 and ground. The output $\overline{Q}$ of the D-flipflop is connected to its input D1 when the NRZ signal has a given logic level. This is obtained by means of a multiplexer 3 which has a control input with two terminals A0, A1 for two bits. A four-position switch is enabled connecting a terminal ZA to one of the four terminals Y0A, Y1A, Y2A, Y3A as a function of the four possible values of a word applied to the input A0, A1. The output $\overline{Q}$ is connected to the terminals Y0A and Y2A and the D1 input of the flipflop 2 is connected to the terminal ZA by a resistor 7. The terminals Y1A and Y3A are floating contacts. The output $\overline{Q}$ is connected to the terminal A1 and the input NRZ signal is conveyed to the terminal A0. The multiplexer 3 is, for example, of the logic series called CMOS, model 4052. When the terminal A0 (that is to say, the NRZ signal) is zero, the output D1 is connected, via terminal ZA, either to Y0A or to Y2A (depending on the value applied to the input terminal A1), that is to say, to the output $\overline{Q}$ of the D-flipflop.

Figure 3:
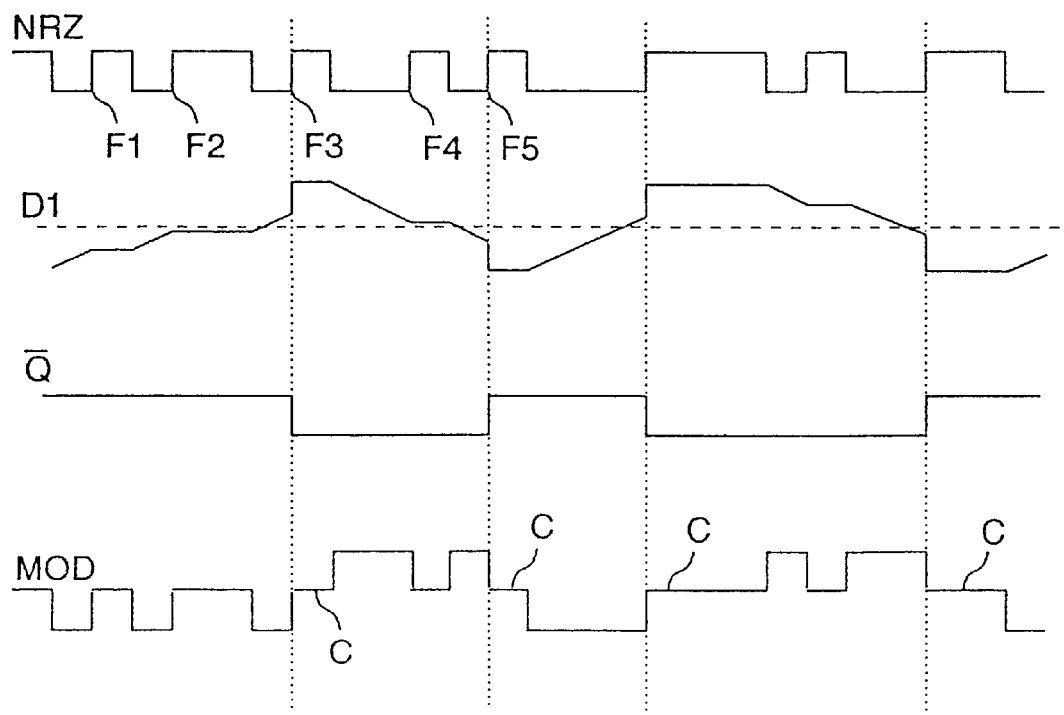
FIG. 3 is a timing diagram showing signals encountered in the arrangement shown in FIG. 2.

In FIG. 3, the line NRZ represents an example of NRZ signal to be coded. The line D1 represents the voltage corresponding to the input D1 of the D-flipflop. The line $\overline{Q}$ represents the signal on the output $\overline{Q}$ of the flipflop. The line MOD represents the resulting frequency control voltage. To simplify matters, let us suppose that the threshold voltage to be applied as D1 to make the flipflop switch is the same in the two directions; this voltage is represented by a broken horizontal line. Let us suppose that in the beginning the voltage is low at D1, and the voltage is high at $\overline{Q}$. The voltage at $\overline{Q}$ is applied to D1, but only when NRZ is low, via Y0A or Y2A and the resistor 7: the voltage rises at D1 during all the periods in which NRZ is low, while discharging the capacitor 1. When the rising edges F1 and F2 of NRZ applied to the input CP arrive, the voltage D1 is still below the threshold voltage and nothing happens. When the rising edge F3 is there, the voltage at D1 has risen to beyond the threshold, the output Q changes to the high state and the output $\overline{Q}$ to the low state. During the periods of time when NRZ is low, the resistor 7 is connected to the output $\overline{Q}$ which is now low and the voltage at D1 drops. When the rising edge F4 arrives, the voltage D1 is still beyond the threshold voltage and nothing happens. When the rising edge F5 arrives, the voltage at D1 has dropped to below the threshold, the output Q changes to the low state and the output $\overline{Q}$ to the high state, and so on and so forth. This arrangement forms a highly particular specimen of a flipflop which switches when the NRZ signal has a rising edge, provided that the voltage at D1 controlled by the capacitor 1 has sufficiently varied since the last switching, that is to say, after a certain delay. For the switching to happen, a rising edge of the NRZ signal is needed, that is to say, a change to the logic "high" state which corresponds to the median voltage. Thus, a period of time in which the frequency is the center frequency is always situated between a period having a positive frequency deviation and a period having a negative frequency deviation. Such periods are indicated by reference C on the line MOD.

The model 4052 multiplexer further has a second switch connecting a terminal ZB to one of the terminals Y0B, Y1B, Y2B, Y3B under the control of the same inputs A0, A1. This makes it possible to produce the control signal MOD: by means of a bridge divider comprising resistors 8, 9 inserted between a reference voltage VCC and ground, three voltages are created, a high, a median and a low voltage. The median voltage is applied to the terminals Y1B and Y3B together. The low voltage is applied to the terminal Y3B. The high voltage is applied to the terminal Y0B. The control signal MOD is available on terminal ZB. For the switch A, the input A1 could as well be connected to a fixed voltage, but for the switch B the connection of $\overline{Q}$ to A1 is necessary.

Figure 4:
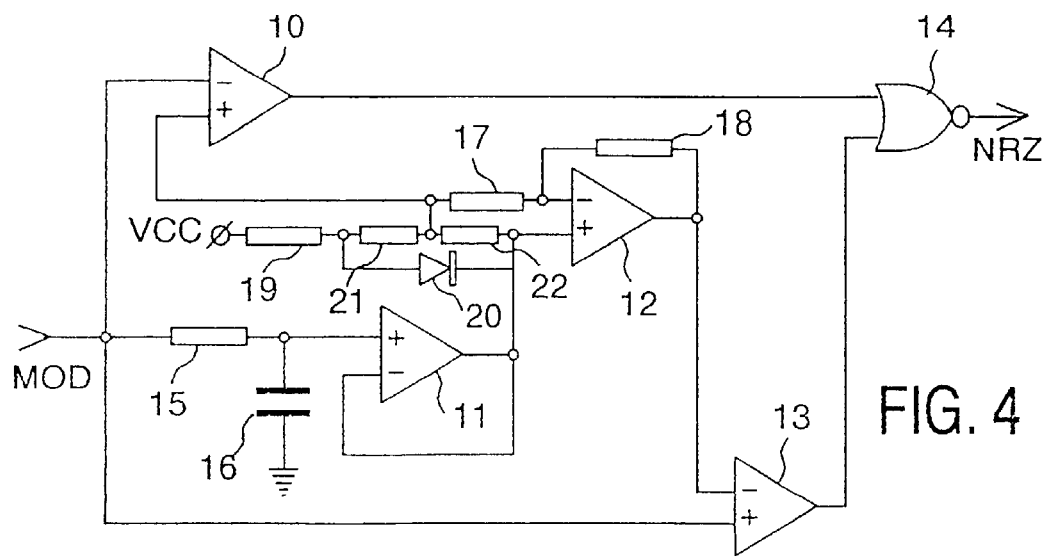
FIG. 4 represents a circuit of a receiver which produces an NRZ signal reconstructed on the basis of a signal coming from a frequency demodulator.

In a receiver, the received frequency signal is demodulated in a frequency demodulator (not shown) which does not form part of the invention. A demodulated signal which reproduces the control signal having the modulation mentioned above (therefore it is still called MOD) is taken to the input MOD of the device of FIG. 4 which comprises two input comparators 10 and 13. The threshold voltage of the comparator 10, applied to its "+" input is set so that it is enabled, that is to say, produces a high signal when its inverting input receives a negative signal which is lower than the threshold, corresponding, for example, to a negative frequency deviation. The threshold voltage of the second comparator 13, applied to its "−" input is set so that it reacts, that is, produces here a high signal when its "+" input receives a positive signal that is higher than the threshold, which corresponds, for example, to a positive frequency deviation.

A logic circuit 14, here a NOR gate has its inputs connected to the outputs of the comparators 10 and 11 and produces on the output the reconstructed NRZ signal. Its output is a zero output when the first input comparator receives a negative signal or also when the second input comparator receives a positive signal, that is to say, for a logic "zero" value. There may be imagined input comparators which produce a low signal when they are enabled, in which case the circuit 14 would be an AND gate.

A low-pass filter or analog integrator of the demodulated signal, formed by the resistor 15 and the capacitor 16, produces a voltage called mean voltage which represents the average value of the signal MOD. This voltage is used again by an operational amplifier 11 arranged as a unity gain follower, after which the voltage is shifted by a shift circuit. This circuit is formed by a divider bridge which comprises a resistor 19 connected in series to a diode 20, between a reference voltage VCC and the output of the amplifier 11.

The diode 20 imposes a practically constant voltage between its terminals, and resistors 21 and 22 form a divider which takes a part therefrom. The voltage on the node between the resistors 21 and 22 is thus shifted by a constant value relative to the output voltage of the amplifier 11. The voltage is applied to the "+"input of the comparator 10 and forms a first threshold voltage.

An operational amplifier 12 is called a balanced voltage creator. It is arranged in known fashion as a fixed gain amplifier by a resistor 17 connected, on one side, to above-mentioned shifted voltage and on the other side to the "−" input of the amplifier, and by a resistor 18 connected, on one side, to the output of the amplifier 12 and, on the other side, to its "−" input. The "+" input is connected to the above-mentioned mean voltage. Thus, on the output a voltage is produced that is a practically balanced voltage relative to the mean voltage. This output is connected to the "−" input of the comparator 13, forming a second threshold voltage. The four comparators or amplifiers 10 to 13 are advantageously constructed on the basis of a same casing having four amplifiers.

What is claimed is:

1. A method of transmitting a frequency-modulated asynchronous NRZ signal, associating a transmitting frequency called center frequency to a given logic value and a frequency deviation which is sometimes positive and sometimes negative relative to the center frequency to the reverse logic value, characterized in that the deviation has a positive value during a first period of time and then a negative value during a second period of time, these periods of time being determined in analog manner, so that the cumulated sum of the first periods and the cumulated sum of the second periods are practically equal in the course of time, further characterized in that a period of time in which the frequency is a center frequency is always situated between a period having a positive frequency deviation and a period having a negative frequency deviation.

2. A method as claimed in claim 1, characterized in that, while the frequency modulation is provided by an oscillator having a phase-locked loop, the time constant of this loop is higher than said periods of time.

3. A transmitter device for transmitting the frequency-modulated asynchronous NRZ data, comprising a frequency control voltage generator which produces three control voltage values called low, median, high voltage, associating the median voltage to a given logic value, and sometimes the high voltage and sometimes the low voltage to the reverse logic value, characterized in that it comprises means for producing the high voltage during a first period of time and the low voltage during a second period of time, so that the cumulated sum of the first periods and the cumulated sum of the second periods are practically equal in the course of time.

4. A transmitter device as claimed in claim 3, characterized in that it comprises an analyzer element for analyzing the asynchronous NRZ signal, which analyzer element comprises an analog integrator for measuring the time and actuates a switch for the selection of one of the three control voltage values.

5. A transmitter device as claimed in claim 4, characterized in that the analyzer element comprises a D-flipflop to whose clock input is fed the asynchronous NRZ signal, a resistance-capacitance feedback network between the output Q and the input D of the flipflop, and means for connecting the output $\overline{Q}$ of the D-flipflop to its input D only when the NRZ signal has a given logic value.

6. A receiver device for receiving a frequency modulated NRZ signal having a positive frequency deviation corresponding to a logic value during a first period of time and a negative frequency deviation corresponding to said logic value during a second period of time, characterized in that for processing a demodulated signal the receiver device comprises a comparator whose threshold voltage is set so that it is activated by a negative signal, another comparator whose threshold voltage is set so that it is activated by a positive signal, and a logic circuit connected to the outputs of the comparators, of which logic circuit the output, intended to produce the reconstructed NRZ signal, is activated when either comparator is activated.

7. A receiver device as claimed in claim 6, characterized in that it comprises a low-pass filter or analog integrator of the demodulated signal, for producing a voltage called mean voltage which represents the average value of this signal, a shift circuit for producing on its output a shifted voltage relative to this mean voltage, which output is connected to one of the comparators for supplying thereto its threshold voltage called first threshold voltage.

8. A receiver device as claimed in claim 7, characterized in that it comprises a balanced voltage creating circuit for producing on the output a practically balanced voltage of the first threshold voltage relative to the mean voltage, which output is connected to the other comparator for supplying its threshold voltage thereto.

9. A method as claimed in claim 1, characterized in that, while the frequency modulation is provided by an oscillator having a phase-locked loop, the time constant of this loop is higher than said periods of time.

* * * * *